June 3, 1958     I. DROPKIN     2,837,176
SAFETY DEVICE FOR AUTOMOBILES
Filed Sept. 8, 1955
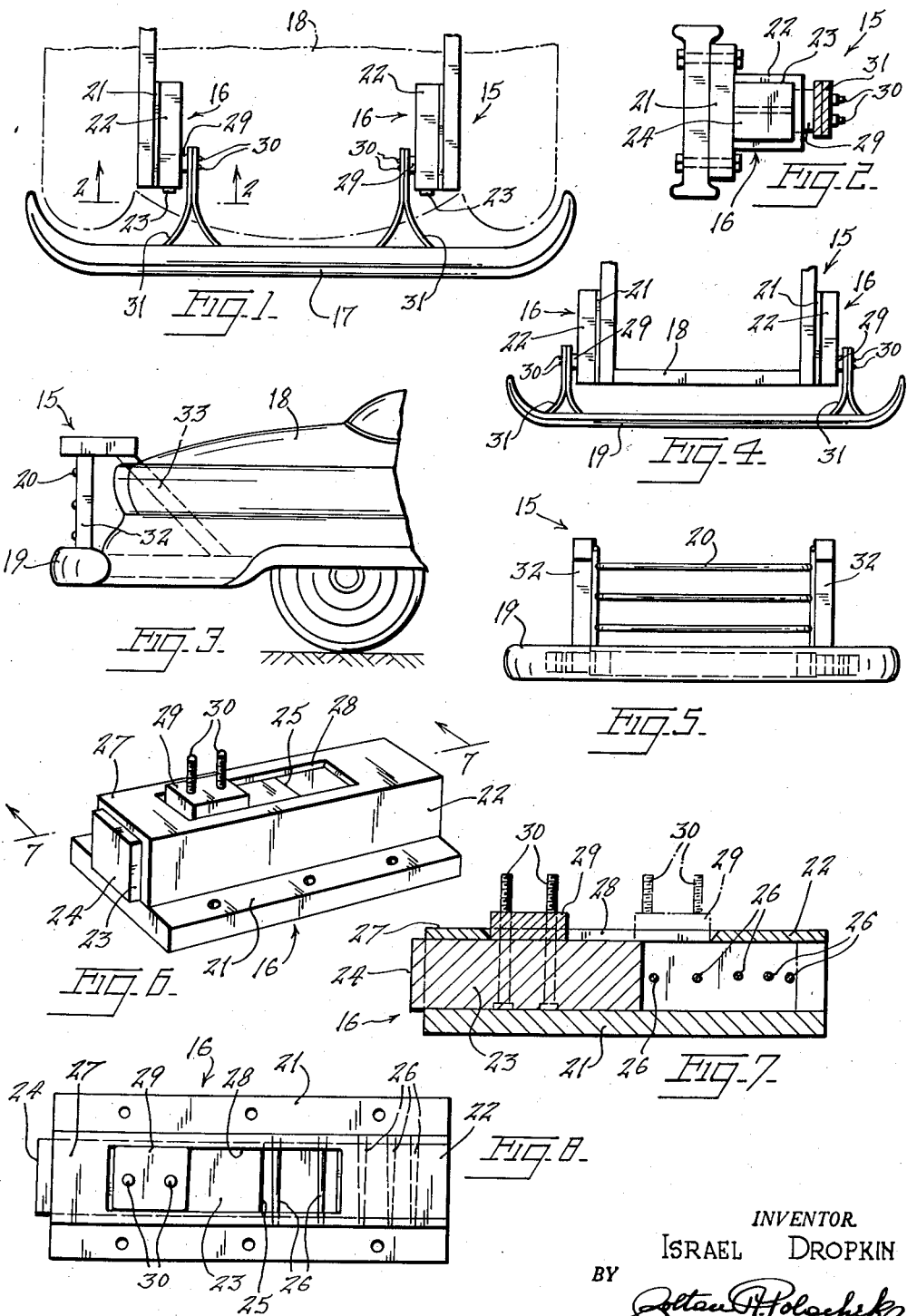
INVENTOR.
ISRAEL DROPKIN
BY
ATTORNEY

United States Patent Office 2,837,176
Patented June 3, 1958

2,837,176

SAFETY DEVICE FOR AUTOMOBILES

Israel Dropkin, Brooklyn, N. Y.

Application September 8, 1955, Serial No. 533,090

2 Claims. (Cl. 188—1)

This invention relates to new and useful improvements in safety collision devices for automobiles.

More particularly, the present invention proposes the construction of an improved safety device for automobiles which will act as an automobile crash or collision shock subduer to absorb the shock of a collision or crash before the body of the automobile collides with the object hit by or hitting the bumper or bumpers of a car.

As a further object, the present invention proposes forming the safety device as a shear pin slide bolt or plurality of shear pin slide bolts with shear pins which will shear progressively on collision to absorb collision shock.

Another object of the invention proposes constructing each shear pin slide bolt with a slide bar slidably mounted in a channel having spaced shear pins extending across the channel behind the slide bar.

Still another object of the invention proposes forming each shear pin slide bolt with tapered shear pins vertically disposed with the large end of each shear pin upwardly disposed.

Another object of the invention proposes constructing the safety device so that it can be mounted either on the front or rear of an automobile and with a plurality of shear pin slide bolts disposed so on impact the force will act on all the shear pin slide bolts uniformly and at the same time.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view, partly broken away, of a safety device constructed and arranged in accordance with the present invention and with an automobile partly shown in dot-dash outline.

Fig. 2 is a sectional view taken on line 2—2 of Fig. 1.

Fig. 3 is a side view of the rear of an automobile with the safety device mounted thereon.

Fig. 4 is a top plan view of the structure shown in Fig. 3 with part of the automobile omitted.

Fig. 5 is a rear view of the structure shown in Fig. 3 with part of the automobile omitted.

Fig. 6 is a perspective fragmentary view of one of the shear pin slide bolts.

Fig. 7 is a sectional view taken on line 7—7 of Fig. 6.

Fig. 8 is a top plan view of the structure shown in Figs. 6 and 7.

Referring more particularly to the drawings, the safety device of the present invention is designated generally by the reference numeral 15.

Safety device 15 has shear pin slide bolts 16 identically constructed and connected either with the front bumper 17 of an automobile 18 or with the rear bumper 19 or bumper grill guard 20.

Slide bolt 16 has a base 21 to which is secured the legs of a channel member 22 and a bar 23 is slidably mounted in the channel 22 with a front end 24 extending from the channel member and a rear end 25 disposed in the channel member.

A plurality of shear pins 26 are mounted in the channel member 22 extending across the channel beneath the web 27 and between the legs of the channel member behind the slide bar 23. The shear pins 26 are slightly tapered from end to end and are squarely aligned one behind the other with the large ends of the pins upwardly disposed and all pins vertically disposed when the shear pin slide bolt 16 is mounted on an automobile. The shear pins 26 are disposed at varying distances one from another and are progressively closed from front to rear behind the slide bar 23. Shear pins 26 are of a diameter and strength to be progressively sheared by the rear end 25 of the slide bar on collision of the bumper to which the shear pin slide bolt is attached.

Channel member 22 has an opening 28 in its web 27 disposed forwardly of the shear pins 26 and a plate 29 is secured to the slide bar 23 and slidably disposed in the opening 28. Plate 29 has bolts or studs 30 extending from it to secure the slide bar to bumper supports 31 either at the front or rear of an automobile.

On the front of the automobile two of the shear pin slide bolts are shown mounted and connected with the front bumper 17. On the rear of the automobile, two of the shear pin slide bolts are also mounted and connected by supports 32 and 33 with the rear bumper 19 and bumper grill guard 20. On impact of either bumper, the force will act on all the shear bolts connected with that bumper at the same time and uniformly.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desired to secure by United States Letters Patent is:

1. A braking mechanism comprising a shear pin slide bolt device having a base, a channel member secured to the base, a bar extending partly into the channel member and being slidable therein, a plurality of spaced shear pins extending across the space inside the channel member behind the bar, said shear pins being arranged in spaced relation one behind the other, said channel member having an opening in its web portion, a plate secured to the top of the bar and protruding outwardly through the opening in the web portion and being slidable along said opening, means on the protruding portion of the plate for fastening the plate to a vehicle, said shear pins being disposed at varying distances one from another and being disposed progressively closer from the inner end of the sliding bar to the adjacent end of the channel member.

2. A braking mechanism comprising a shear pin slide bolt device having a plate constituting a base, an inverted channel-shaped member secured to the top of said base, a solid bar partly extending through said channel-shaped member at one end thereof and slidable therein, a plurality of spaced shear pins extending across the space inside the channel-shaped member between the inner end of the sliding bar and the adjacent end of the channel-shaped member, said shear pins being arranged in spaced relation one behind the other in the path of movement of the sliding bar, said channel-shaped member having an opening in its web portion, a plate secured to the top of the sliding bar and protruding outwardly through the opening in the web portion and being slidable along said opening, bolts on the protruding portion of the plate for fastening the plate to a vehicle, said shear pins being disposed at varying distances one from another and being disposed progressively closer from the inner end of the sliding bar to the adjacent end of the channel-shaped member.

References Cited in the file of this patent

UNITED STATES PATENTS

| | | |
|---|---|---|
| 1,691,398 | Long | Nov. 13, 1928 |
| 1,754,104 | Hoffman | Apr. 8, 1930 |
| 2,001,093 | Cherpes et al. | May 14, 1935 |
| 2,401,748 | Dillon | June 11, 1946 |
| 2,510,815 | Granche | June 6, 1950 |
| 2,557,105 | Hight | June 19, 1951 |
| 2,573,510 | Terranova | Oct. 30, 1951 |